United States Patent Office 2,829,169
Patented Apr. 1, 1958

2,829,169

PROCESS OF MANUFACTURING ISOBUTYR-ALDOL AND 2,2,4 - TRIMETHYL - 1,3 - PENTANEDIOL

Hugh J. Hagemeyer, Jr., Longview, Tex., assignor to Eastman Kodak Company, Rochester, N. Y., a corporation of New Jersey No Drawing. Application February 29, 1956
Serial No. 568,443

10 Claims. (Cl. 260—602)

This invention relates to a process of manufacturing isobutyraldol and 2,2,4-trimethyl-1,3-pentanediol, and more particularly to a process in which 2,2,4-trimethyl-1,3-pentanediol is obtained substantially free from by-products. While the reactions involved are not novel, I have invented a process in which the conditions are such that the process can be operated continuously, with good yields, and without the necessity of separating the 2,2,4-trimethyl-1,3-pentanediol from large quantities of isobutanol.

In my process, isobutyraldehyde is subjected to aldol condensation in the presence of an alkaline catalyst and considerable quantities of water, while holding the temperature at not substantially above 20° C. by means of cooling. Isobutyraldoxan is formed. The organic layer from the aldol reactor is overflowed continuously to a neutralization tank, where it is neutralized to a pH of 4 to 6, preferably 5, by means of a very dilute solution of acetic or other aliphatic carboxylic acid, without allowing the temperature to rise. The crude product from the neutralization tank is fed to a distillation column having a base heater. In this column the isobutyraldoxan is split, in the presence of dilute organic acid, into equimolecular quantities of isobutyraldol and isobutyraldehyde, and the latter is distilled off with the water. The distillate is condensed and decanted, and the isobutyraldehyde is returned to the aldol reactor and the water to the distillation column. Isobutyralodl, 95–97% pure, and in better than 90% yields, is obtained by overflowing the base of the column and decanting the organic layer. The isobutyraldol can be hydrogenated directly to form 2,2,4-trimethyl-1,3-pentanediol, or it can be dried and distilled at reduced pressure.

The reactions involved are as follows:

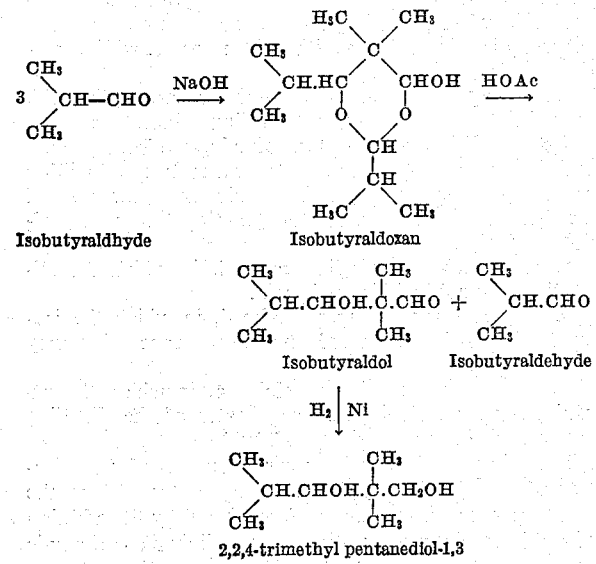

Isobutyraldhyde   Isobutyraldoxan
Isobutyraldol   Isobutyraldehyde
2,2,4-trimethyl pentanediol-1,3

While the prior art has shown partial hydrolysis of isobutyraldoxan to isobutyraldol and isobutyraldehyde by means of dilute sulfuric acid under comparatively mild conditions, the rate of reaction is slow at ordinary temperatures, and at elevated temperatures the isobutyraldoxan reverts to isobutyraldehyde. The following experiments illustrate the difference between the effect of dilute acetic acid and that of dilute sulfuric acid in splitting isobutyraldoxan.

1080 grams of isobutyraldehyde was fed to a small continuous aldol reactor with 0.25% sodium hydroxide solution, the water-to-organic ratio being maintained at 30:70. The aldol reactor was overflowed to a neutralization tank and the crude isobutyraldoxan was neutralized at 10° C., using dilute acetic acid to bring it to a pH of 5.4. The water layer titrated 0.86% acetic acid. The neutralized isobutyraldoxan was then distilled in a 30-plate column, and 349 grams of isobutyraldehyde was recovered. This was 97% of the theoretical amount of isobutyraldehyde to be obtained from splitting of the isobutyraldoxan to isobutyraldol and isobutyraldedhyde. The organic layer remaining in the base of the column was decanted, diluted with an equal volume of ether, and washed three times with water. The organic layer was decanted and the ether, together with dissolved water, stripped off. Distillation of the isobutyraldol at 2 mm. gave a 94% yield of isobutyraldol, B. P. 69–70° C. at 2 mm.

In a similar experiment in which the crude isobutyraldoxan was neutralized to a pH of 5, using dilute sulfuric acid as the neutralizing agent, approximately 110% of the theoretical isobutyraldehyde was recovered from the distillation column. The stripping action was stopped at this point, and the organic residue was diluted with an equal volume of ether and washed free of acid with water. The ether and residual water were stripped off; distillation at 2 mm. gave only 5% isobutyraldol, with the remainder being unchanged isobutyraldoxan.

The continuous selective splitting of isobutyraldoxan to equimolecular amounts of isobutyraldol and isobutyraldehyde is accomplished only with aqueous organic carboxylic acids and at a pH of 4 to 6. Aqueous acetic acid solutions containing from 0.5% to 2% acetic acid are satisfactory. The use of equivalent percentages of mineral acids results in the complete de-aldolization of the isobutyraldoxan to isobutyraldehyde.

A substantially quantitative splitting of isobutyraldoxan to isobutyraldol and isobutyraldehyde is accomplished in a continuous manner by feeding isobutyraldoxan to a column containing aqueous acetic acid, pH 4–6, and azeotroping off the isobutyraldehyde continuously as it is formed.

The use of aqueous solutions of the aliphatic carboxylic acids, at reflux temperatures, is necessary to achieve a reaction rate adaptable to continuous processing. The splitting reaction as carried out under the conditions of my process is rapid and complete.

By way of illustrating my invention, I give the following examples.

*Example 1.*—In a continuous reaction isobutyraldehyde is fed continuously to an aldol reactor containing a 0.1–10% solution of an alkaline catalyst. The reaction temperature is maintained in the range of 0.20° C., and organic to water ratios varying from 70 organic:30 water to 30 organic:70 water may be used. A portion of the liquid in the aldol reactor is continuously overflowed to a neutralization tank, where the aldol reaction mixture is neutralized to a pH of 5–6 with a dilute water-soluble organic carboxylic acid. Usually acetic acid is the preferred neutralization agent.

The crude aldol reaction product is fed from the neutralization tank to a distillation column with a base heater, together with dilute acetic acid as required to maintain a pH of 5–6 in the base of the distillation column. The water in the dilute acetic acid is sufficient to azeotrope off the isobutyraldehyde formed in the splitting of isobutyraldoxan. The isobutyraldehyde, after condensing and decanting, is recycled to the aldol reactor. Isobutyraldol is recovered by overflowing the distillation column base and decanting the organic layer, which is substantially pure isobutyraldol saturated with water. If isobutyraldol is the desired product, the organic layer can be dried and pure isobutyraldol recovered by distilling at reduced pressure. Its boiling point is 69–70° C. at 2 mm.; sp. gr. 20/20=0.943.

In the production of 2,2,4-trimethyl-1,3-pentanediol, the isobutyraldol is overflowed from the base of the distillation column, decanted and pumped to an autoclave. In addition to the isobutyraldol, there is charged to the autoclave 2–10% of Raney nickel and 5–10% additional water, both based on the amount of isobutyraldol. The hydrogenation is carried out at 60–180° C. and at elevated pressures ranging from 100 to 1000 p. s. i. or higher. Substantially pure 2,2,4-trimethyl-1,3-pentanediol is recovered by filtering away the Raney nickel, stripping off the water, and distilling the 2,2,4-trimethyl-1,3-pentanediol at reduced or atmospheric pressure. Pure 2,2,4-trimethyl-1,3-pentanediol distills at 232° C. and sets up to a solid melting at 51° C.

*Example 2.*—1080 grams of isobutyraldehyde was reacted in the presence of 0.25% sodium hydroxide at 10° C. as in Example 1, the aldol reactor being continuously overflowed and the product neutralized to pH=5 with dilute acetic acid. The crude product from the neutralization tank was fed to a stripping column containing 1% acetic acid in the base, in which the isobutyraldoxan was split to isobutyraldehyde and isobutyraldol, with the isobutyraldehyde being stripped off the top of the column and recycled to the aldol reactor. The base was overflowed, and the organic layer from the overflow was decanted and charged to a 2-liter rocking autoclave with 5% Raney nickel and 10% by volume of water. The isobutyraldol was then hydrogenated at 125°–165° C. for 4 hours, or until the aldehyde content in the autoclave was less than 0.1%. The autoclave was discharged, and the contents filtered through Filter-Cel (processed diatomaceous earth) and charged to a distillation column. After stripping out water and 2–3% of low boilers, a 94% yield of 2,2,4-trimethyl-1,3-pentanediol, B. P. 230–232° C. at 760 mm., was obtained. Upon cooling, the trimethyl pentanediol set up to a white crystalline product, M. P. 51° C.

In experiments similar to those carried out in Example 1, neutralization of the isobutyraldoxan was carried out with propionic, butyric and isobutyric acids. The results obtained were approximately the same, but acetic acid is the preferred acid for reasons of economy and availability.

*Example 3.*—The following data is taken from the operation of a pilot plant having a capacity of 1000 lbs. of isobutyraldol per day. Isobutyraldehyde was fed to an aldol reactor of 50 gallons capacity at the rate of approximately 1 lb. per minute (make-up 0.74 lb./min.; recycle 0.23 lb./min.). The reactor temperature was controlled at 10–20° C. by circulating the reactor liquid through a brine-cooled heat exchanger. Sodium hydroxide was employed as a catalyst, the concentration of NaOH in the water layer being held between 0.18% and 0.25%. The organic-to-water ratio was held at 70:30. The organic layer from the aldol reactor was overflowed continuously to a stirred neutralization tank held at 10–20° C. by cooling, and a 2% aqueous solution of acetic acid was added to maintain a pH of 5. The crude product from the neutralization tank was fed to a distillation column at the rate of 1–1.2 lbs./min. The base heater of the distillation column was operated at an organic-to-water ratio of 20:80, a pH of 4–6, and percent acetic acid, 0.5–2. The temperature of the base heater varied from 103–107° C. and the column top temperature from 64–68° C. The isobutyraldehyde split off and the splitting of the isobutyraldoxan was stripped off, condensed, decanted from the water layer and returned to the aldol reactor as recycle isobutyraldehyde feed. The water layer was returned to the distillation column. Isobutyraldol of 95–97% purity was obtained simply by overflowing the base of the distillation column and decanting the organic layer.

The crude isobutyraldol can be hydrogenated directly to form 2,2,4-trimethyl-1,3-pentanediol, or it can be dried and distilled at reduced pressure.

What I claim as my invention and desire to be secured by Letters Patent of the United States is:

1. A continuous process of manufacturing isobutyraldol, which comprises making isobutyraldoxan in an aldol reactor by the aldol condensation of isobutyraldehyde in the presence of an alkali and water, at a temperature not substantially exceeding 20° C., bringing the pH of the isobutyraldoxan to a value of from 4 to 6 by the addition of a dilute aqueous solution of an aliphatic carboxylic acid, without allowing the temperature to rise, splitting the isobutyraldoxan into equimolecular quantities of isobutyraldol and isobutyraldehyde by distilling the aqueous, neutralized product in a distilling column with a base heater while holding the pH in the range of from 4 to 6 by further addition of dilute aqueous solution of aliphatic carboxylic acid, removing from the top of the distilling column a mixture of isobutyraldehyde and water, recycling the isobutyraldehyde to the aldol reactor and the water to the distilling column, and overflowing isobutyraldol from the base of the distilling column.

2. A process according to claim 1, in which the aliphatic carboxylic acid is acetic acid.

3. A process according to claim 1, in which the organic-to-water ratio in the base heater of the distilling column is held at approximately 20:80.

4. A process of manufacturing 2,2,4-trimethyl-1,3-pentanediol substantially free from isobutanol, which comprises manufacturing isobutyraldol continuously by making isobutyraldoxan in an aldol reactor by the aldol condensation of isobutyraldehyde in the presence of an alkali and water, at a temperature not substantially exceeding 20° C., bringing the pH of the isobutyraldoxan to a value of from 4 to 6 by the addition of a dilute aqueous solution of an aliphatic carboxylic acid, without allowing the temperature to rise, splitting the isobutyraldoxan into equimolecular quantities of isobutyraldol and isobutyraldehyde by distilling the aqueous, neutralized product in a distilling column with a base heater, while holding the pH in the range of from 4 to 6 by further addition of dilute aqueous solution of aliphatic carboxylic acid, removing from the top of the distilling column a mixture of isobutyraldehyde and water, recycling the isobutyraldehyde to the aldol reactor and the water to the distilling column, and overflowing isobutyraldol from the base of the distilling column, and hydrogenating the isobutyraldol.

5. A process according to claim 4, in which the aliphatic carboxylic acid is acetic acid.

6. A process according to claim 4, in which the isobutyraldol is hydrogenated in the presence of Raney nickel.

7. A process according to claim 4, in which the organic-to-water ratio in the base heater of the distilling column is held at approximately 20:80.

8. A process of manufacturing isobutyraldol from isobutyraldoxan which comprises bringing the pH of the isobutyraldoxan to a value of from 4 to 6 by the addition of a dilute aqueous solution of an aliphatic carboxylic acid without allowing the temperature to rise substantially above 20° C., splitting the isobutyraldoxan into equimolecular quantities of isobutyraldol and isobutyraldehyde by distilling the aqueous mixture in a distilling column with a base heater while holding the pH in the range of from 4 to 6 by further addition of dilute aqueous solution of aliphatic carboxylic acid, removing from the top of the distilling column a mixture of isobutyraldehyde and water, recycling the water to the distilling column, and overflowing isobutyraldol from the base of the distilling column.

9. A process according to claim 8, in which the aliphatic carboxylic acid is acetic acid.

10. A process according to claim 8, in which the organic-to-water ratio in the base heater of the distilling column is held at approximately 20:80.

References Cited in the file of this patent

FOREIGN PATENTS 682,260   Great Britain _____ Nov. 5, 1952

U. S. DEPARTMENT OF COMMERCE
PATENT OFFICE

CERTIFICATE OF CORRECTION

Patent No. 2,829,169     Hugh J. Hagemeyer, Jr.     April 1, 1958

It is hereby certified that error appears in the printed specification of the above numbered patent requiring correction and that the said Letters Patent should read as corrected below.

Column 1, line 42, for "Isobutyralodl" read -- Isobutyraldol --; line 60, for "Isobutyraldhyde" read -- Isobutyraldehyde --; column 2, line 64, for "0.20° C." read -- 0-20° C. --; column 4, line 6, for "and" read -- in --.

Signed and sealed this 10th day of June 1958.

(SEAL)
Attest:
KARL H. AXLINE
Attesting Officer

ROBERT C. WATSON
Commissioner of Patents